(12) United States Patent
Shanley

(10) Patent No.: US 9,892,022 B2
(45) Date of Patent: Feb. 13, 2018

(54) APPARATUS FOR MINIMALLY INTRUSIVE DEBUGGING OF PRODUCTION USER INTERFACE SOFTWARE

(71) Applicant: VMware, Inc., Palo Alto, CA (US)

(72) Inventor: Dave Shanley, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 97 days.

(21) Appl. No.: 15/081,513

(22) Filed: Mar. 25, 2016

(65) Prior Publication Data

US 2017/0277621 A1    Sep. 28, 2017

(51) Int. Cl.
  *G06F 9/44* (2006.01)
  *G06F 11/36* (2006.01)
  *G06F 3/0484* (2013.01)

(52) U.S. Cl.
  CPC ........ *G06F 11/3664* (2013.01); *G06F 3/0484* (2013.01); *G06F 8/30* (2013.01); *G06F 11/3696* (2013.01)

(58) Field of Classification Search
  None
  See application file for complete search history.

(56) References Cited

U.S. PATENT DOCUMENTS

| | | | | |
|---|---|---|---|---|
| 7,356,804 B2 * | 4/2008 | Blumenthal | ........ | G06F 11/3688 702/119 |
| 8,578,336 B1 * | 11/2013 | Wiradarma | ......... | G06F 11/3684 717/125 |
| 9,558,465 B1 * | 1/2017 | Arguelles | ........... | G06Q 10/0639 |
| 2003/0182601 A1 * | 9/2003 | Richardson | .... | G01R 31/318307 714/46 |
| 2008/0250051 A1 * | 10/2008 | Grechanik | ............ | G06F 11/368 |
| 2008/0295076 A1 * | 11/2008 | McKain | ................ | G06F 9/4443 717/124 |

(Continued)

*Primary Examiner* — Insun Kang

(57) ABSTRACT

An article of manufacture comprises a computer readable medium having stored therein a computer program for a method for debugging of a production application, the computer program comprising a first code segment which, when executed on a computer, accesses a context object associated with an application method of the production application, such that the application method is mapped to an application name and execution of the application method can be replaced by a first pre-defined replacement method; a second code segment which, when executed on the computer, accesses a test module containing one or more overrides and a reference to the application method, where the override is associated with the first pre-defined replacement method and is associated with the application name associated with the context object; a third code segment which, when executed on the computer, accesses a debugging user interface for implementing one or user interactions, each interaction associated with a method mapping on the context object; a fourth code segment which, when executed on the computer, accesses a dashboard module, coupled to the computer, comprising references to test modules and a debugging user interface specification; wherein a main user interface specification includes a reference to the dashboard module; and wherein on request in the debugging user interface specification, the one or more overrides are substituted for the application method.

19 Claims, 19 Drawing Sheets

(56) References Cited

U.S. PATENT DOCUMENTS

| | | | |
|---|---|---|---|
| 2009/0037881 A1* | 2/2009 | Christy | G06F 11/3664 717/124 |
| 2009/0077539 A1* | 3/2009 | Booth | G06F 11/3688 717/124 |
| 2010/0242024 A1* | 9/2010 | Gonzales, II | G06F 8/51 717/125 |
| 2011/0145795 A1* | 6/2011 | Khanapurkar | G06F 11/3414 717/126 |
| 2012/0017165 A1* | 1/2012 | Gardner | G06F 17/30899 715/771 |
| 2013/0042146 A1* | 2/2013 | Unger | G06F 11/3672 714/32 |
| 2014/0101640 A1* | 4/2014 | Romdhane | G06F 11/3684 717/125 |
| 2015/0135169 A1* | 5/2015 | Lin | G06F 11/3688 717/131 |
| 2015/0309906 A1* | 10/2015 | Salame | G06F 11/079 714/33 |
| 2017/0168919 A1* | 6/2017 | Eberlein | G06F 11/3664 |
| 2017/0185509 A1* | 6/2017 | Arkadyev | G06F 11/3696 |

* cited by examiner

```
┌─────────────────────────────────────────────────────────┐
│   Accessing a context object coupled with application   │
│   methods of an application module, such that the       │
│   application methods are mapped to names of the        │
│   application methods and execution of the application  │
│   methods can be replaced by at least one pre-defined   │
│   method  602                                           │
└─────────────────────────────────────────────────────────┘
                            │
                            ▼
┌─────────────────────────────────────────────────────────┐
│   Accessing a test module coupled with the computer,    │
│   the test module containing one or more overrides,     │
│   where the override is a pre-defined method that can   │
│   be associated with one of the names of the            │
│   application methods on a context object  604          │
└─────────────────────────────────────────────────────────┘
                            │
                            ▼
┌─────────────────────────────────────────────────────────┐
│   Accessing a debugging user interface specification,   │
│   comprising one or more user interactions, each        │
│   interaction associated with a method mapping on the   │
│   context object  606                                   │
└─────────────────────────────────────────────────────────┘
                            │
                            ▼
┌─────────────────────────────────────────────────────────┐
│   Accessing a dashboard module, coupled with the        │
│   computer, comprising references to the test module    │
│   and the debugging user interface specification  608   │
└─────────────────────────────────────────────────────────┘
```

*FIG. 6*

APPARATUS FOR MINIMALLY INTRUSIVE DEBUGGING OF PRODUCTION USER INTERFACE SOFTWARE

BACKGROUND

In web-based applications there are three layers of processing; the user interface, business logic, and data processing layers. The user interface layer consists of a set of items displayed to the user that can be read-only, such as labels or fixed values; read-write, as in form values or check boxes; or write-only, as in buttons. The data processing layer integrates the application layer with the either stored information or external systems. The business logic layer is the glue that binds these other two layers, translating requests from the data processing layer to information that can be displayed to a user, or vice versa. These applications are embedded on one or more computers.

User interface (UI) components are event driven. An action associated with the components can be triggered either through direct user action, a response from the business logic to an external request or an earlier action from a user interface component, or from a timer. In complex systems, it is important to be able to test each layer independently. But drivers to do so may be challenging. For instance, a user interface action may only occur in response to a rarely-seen hardware failure.

In response to this, engineers have devised complex processes that simulate events. This requires significant changes to the production application to know when it is under test. For example, a tester needs to trigger obscure states inside the UI that may require multiple server side events to get to that state. For this to occur, production application code must be aware of this testing and requires test code to be embedded. Hence, test procedures, frameworks, cases, suites and runners must be defined ahead of time and built into or hooks made available to production code. Often this means production code has test flags, switches and circuit breakers embedded therein.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 6 is a flow diagram of an exemplary method for debugging in accordance with an embodiment.

Figure 1:
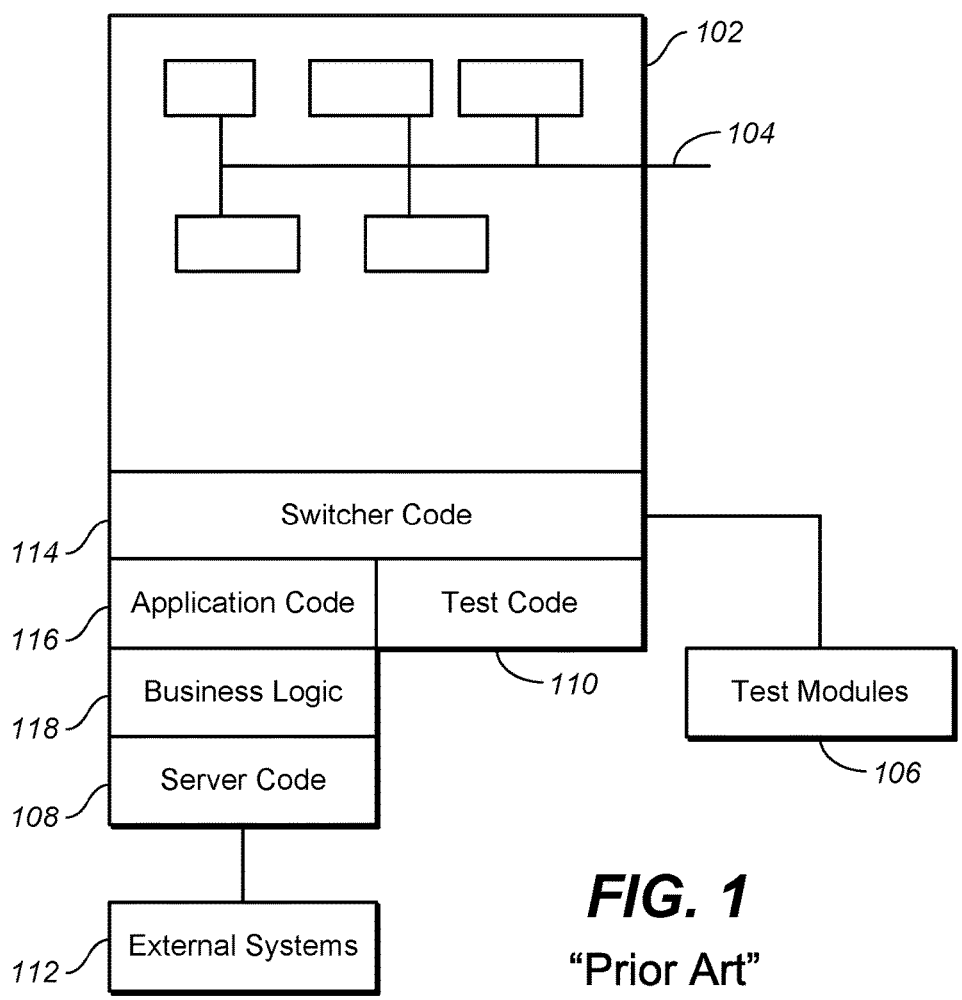
FIG. 1 shows a block diagram of a system for debugging production code, in accordance with an embodiment.

The figures are provided in order to provide a thorough understanding of the present invention. The figures should not be construed as limiting the breath of the invention in any manner.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

A large number of UI (User Interface) components are event driven, either via incoming asynchronous events sent via RPC, sockets or polling. Server driven events make it difficult test UI components that require the server to drive event management. Typically these events can be mocked for test cases—but it doesn't allow for granular UI state triggering to test handling.

The testing & debugging tool described herein allows UI developers to override live production logic and inject their own test logic and handling to simulate or mutate server side event handling. It allows us to trigger obscure states inside the UI that may require multiple server side events to create complex models. The embodiments described herein allow testing of code, testing of a UI and testing of UX (user experience) without ever having to worry about weaving in test or mock code into production code. Testing can be performed on an already deployed live UI application system.

Embodiments described herein enable user interface testers to override logic and inject their own test logic and handling to simulate or mutate server side event handling. This solution allows testers to test UI functionality in as much granularity is required, in a production-ready application without weaving in test code into production code. Embodiments described herein provide debugging of production code without the requirement of having any test code or mock code in the production/live code.

In one embodiment, a dashboard UI is provided for simple and quick interactive debugging. The dashboard works by loading up from a single JavaScript include. It self loads all of its own resources, classes, style sheets, templates and models.

The Dashboard described herein loads in test modules (created by developers). All the test modules are validated and checked to make sure any dependencies that they rely on are available. Validation also checks the test module to ensure it contains the required properties and that it can find the defined context object (this is what the module binds to when to overriding/monkey patching production logic). The dashboard UI is then dynamically generated based on the available modules that could be validated and located. As the module loads, using a form of reflection, it will override the method on context object with your test module override logic. Every time a user turns the override on or off, the dashboard will re-wire back in the application original/production logic, or the application test module logic.

In one embodiment, the debugging system provided herein maintains a reference to one or more application JavaScript context objects and their methods, along with custom event handlers and test code, through a custom user interface. These JavaScript context object methods are mapped to methods in a test module object, which the user can then use to dynamically override the methods in the application JavaScript object. In a similar manner, the user can switch on and off the custom event handlers. No code changes are required to use the debugging solution described herein except in one embodiment, the debugging requires the inclusion of a single JavaScript object in each web page to be debugged.

Embodiments described herein provide a completely dynamic and self loading engine that enables UI developers to create simulations, triggers and override production code logic so they can test the UI without needing any real backend data or server backend to be active to deliver events or data. Its main purpose is to allow developers to fully test all their UI components without having to mix in test or mock code into the production code.

In one embodiment, production code can be dynamically replaced with the test code on demand, it can be enabled and disabled at both the trigger, override and the module level, meaning one can bypass individual segments of business logic or test logic in whatever way required. Triggers act custom functions that allow the set-up and tear-down of data/objects required to properly simulate a stream of UI events or custom event sequences that don't exist in production code.

FIG. 1 shows the prior art, where the user interface of an application has to be aware of whether it is under test or in a production mode. One or more user interface components 104 running in a browser or other user interface container 102 connect to a server via business logic 118 via each User interface component's application code 116. The business logic 118 in turn is integrated with the server code 108 that is coupled to the various external systems 112 that the application needs to communicate with.

However, in order to enable testing of the user interface components, test modules 106 would need to enable test code 110 which would consist of stubs and drivers to replace the calls to the application code 116, via some switcher code or logic 114 embedded in the application code to allow it to switch between test and production. This can be implemented in many ways, but the outcome is always the same; test code is intertwined in production code in such a way that it is difficult to maintain or upgrade.

Figure 2:
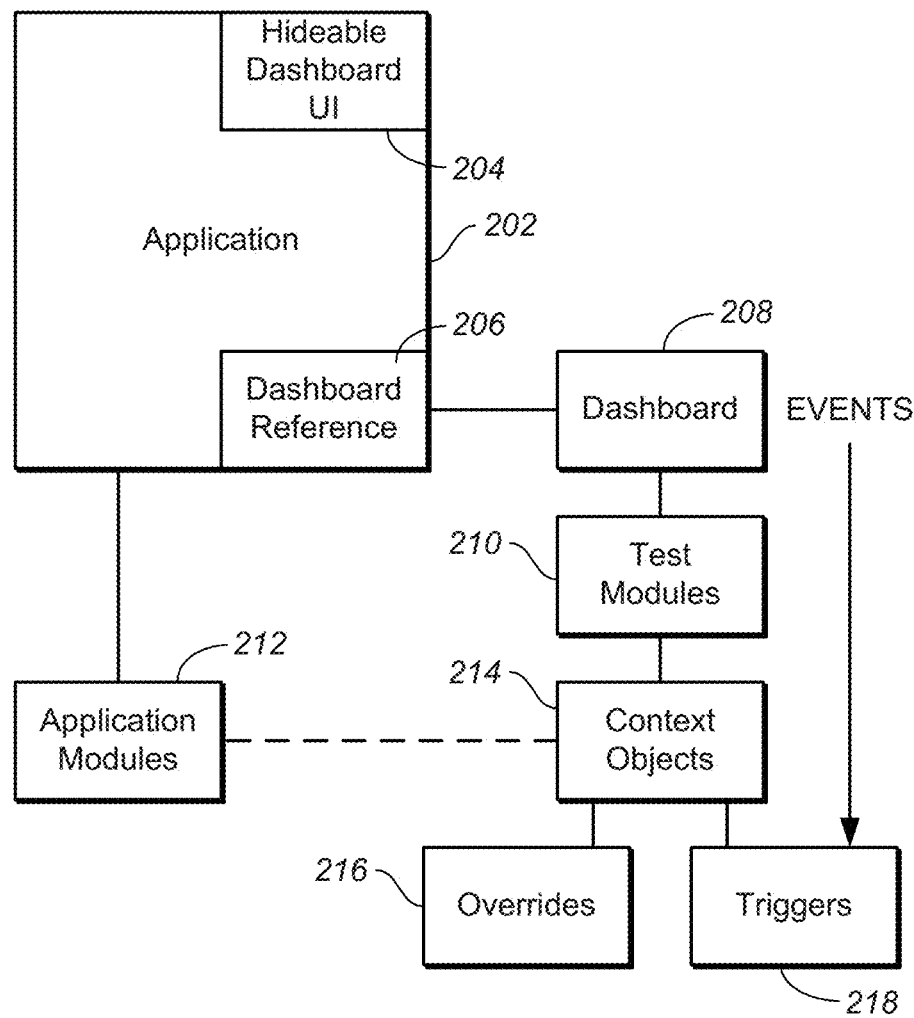
FIG. 2 is a block diagram of data processing, in accordance with an embodiment.

FIG. 2 shows an overview of one or more embodiments of the invention. A reference to the dashboard module 206 is embedded in the application. In one or more embodiments, this is required as the last entry in the page description for a single-page web application. A call to the initialization code of the Dashboard Module 208 is also required as part of the application initialization. As a result of this call, the Dashboard Module 208 is loaded into the application 202. When the Dashboard Module 208 is initialized, it loads all of the test modules 210 which in turn load the Context Objects 214 associated with each test module 210.

In one or more embodiments, the test processing loads up from a single dashboard reference 206 embedded in the application 202. The dashboard reference 208 loads the dashboard object 208 into the application. In one or more embodiments, loading the dashboard object 208 causes it to load all of its' own resources, classes, style sheets, templates and models.

In one or more embodiments, the dashboard object should only be loaded once everything else has been declared and defined so that the dashboard can connect to the user interface components properly and load the Hideable Dashboard UI 204 into the Application 202.

As a result, production applications do not need to be aware of the dashboard.

The Dashboard Object 208 contains a list of test modules 210 to load. In one or more embodiments, the list is implemented as a list of strings, each string uniquely associated with an existing test module. In one or more embodiments, this can be implemented where the string is the module name without the file extension. On startup, each test module 210 loads any dependencies defined in the modules and associated Context Objects.

Prior to the dashboard object 208 loading each test module 210, each test module is validated and checked to make sure it exists, and that any dependencies that it relies on are available, including the context object. The dashboard UI is then dynamically generated based on the validated list of test modules.

Example: Contents of developer_dashboard.jsp

```
<script src="/resources/js/devdash/DeveloperDashboard.js"></script>
<script>
    // enable developer dashboard to allow UI testing & simulation.
    developerDashboard = new DeveloperDashboard( );
    developerDashboard.load(true);
</script>
```

A test module 210 contains a set of methods which implement overrides 216 and triggers 218, driven by a context object 214. Each context object 214 is associated with an Application Module 212, such that the context object 214 contains the links between the method calls and the responses that the test object will make when each method call is requested.

Initially this will be a direct mapping between the method call and the application module method call. On selecting an override from the Dashboard UI, 204, the module loads, using a form of reflection, and override the method on the context object with the test module override method. Every time the override method is turned on or off, the dashboard will rewire back in the original/production method, or the test module override method onto the context object 214.

Overrides 216 are method definitions that can be dynamically swapped out as required during testing. On input to the dashboard, the override code will be swapped with the original method logic captured in the Context Object 214 with the code defined in the override for that method. In one or more embodiments, the original logic is wiped out from the original Context Object 214 with the method that has the same name as the override method.

In one or more embodiments, the dashboard object 208 has a memory and can swap in and out the original and test logic at will, on request from a user via the Hideable Dashboard UI 204, happens automatically when the module or the override is disabled or enabled. In one or more embodiments, the override is named override_x, where x is the name of the method.

Triggers 218 are blocks of code that you want to be executed on demand. Triggers 218 can perform whatever logic a tester wants to simulate an event. Triggers 218 can be fired from the Hideable Dashboard UI. Triggers 218 can also be fired in response to an event received by the Application UI. In one or more embodiments, custom arguments can be passed into triggers 218. In one or more embodiments, the Dashboard Object 208 maintains a mapping of trigger events to triggers 218.

Overrides are used as patching injects, meaning the dashboard will swap out the original method logic with the new, test happy, test friendly logic. This is a swap and the original logic is wiped out from the original contextObject with the method that has the same name as the override method. The dashboard has a memory and can swap in and out the original and test logic at will, on demand (happens automatically when the module or the override is disabled or enabled).

To define an override, one must use the following syntax override_myOriginalMethod. So, if one wanted to override the method createConfigurationSectionModel( ) on the manageMaster object. One would need to name the trigger override_createConfigurationSectionModel and one would need to make sure that they set the contextObject property inside the module to manageMaster.

Example

```
...
override_createConfigurationSectionModel:function( ) {
    var data = {
        generated_log_label: managementCopy.generated_log_label,
        download_log_button:
        managementCopy.download_log_button,
        generate_log_button: managementCopy.generate_log_button,
        ...
    custom_variable1: "SOMETHING FAKE",
        custom_variable2: "SOMETHING FAKER",
        custom_variable3: "SOMETHING FAKEST"
    }
    return data;
},
...
```

Post constructs are executed after the modules have all loaded up and the dashboard is ready. Post constructs will be fired on every module that has them. This follows the same idea that Spring Framework implements with a @PostConstuct annotation. Below is an example of a Debugging Console Module (that doesn't do much except perform a Post Construct operation).

```
...
postConstruct: function( ) {
    // turn this on.
    this.log(developerDashboard.style.postConstructMessage('turning on devdash-to-streaming console message injection'));
    developerDashboard.injectLocalConsoleMessages=true;
}
...
```

In one embodiment, if a module needs another module in order to operate, a developer can declare dependencies for that module. If the dependencies don't exist, then the module won't be loaded either. One can define as many dependencies as they want, add them to the array. Dependencies are declared in the initialization section of the module and the property name is dependsOn.

Example of a Dependency:

```
...
initialize: function( ) {
    // Module compulsory values, won't validate without these being
correctly defined.
    this.id="AuthModule";
    ....
    // which other modules does this one depend on? It won't be
allowed
    // to activate if the other module isn't available or won't
activate.
    this.dependsOn = ['DebuggingConsoleModule'];
...
},
...
```

Sample Module:

```
var SampleModule = BaseModule.extend({
    initialize: function( ) {
        // Module compulsory values, won't validate without these
being correctly defined.
        this.id="SampleModule";
        this.name = "Dave's Sample Module";
        this.description = "As useless as a chocolate teapot.";
        this.version = 1;
        this.contextObject = masterConsoleView
        this.contextObjectAsString = 'masterConsoleView';
        // register, validate, add to the UI and realtime patch
everything.
        // This is the only call you need to make.
        this.setup( );
    },
});
```

Figure 3:
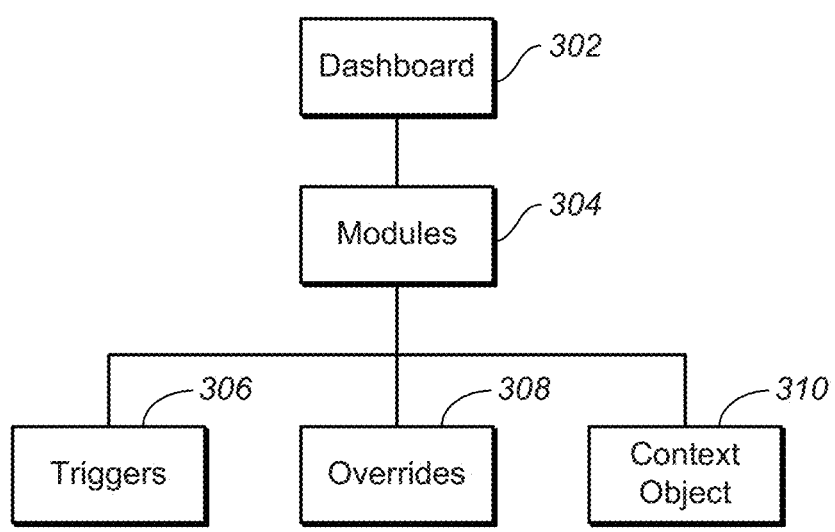
FIG. 3 is a block diagram of a data structure, in accordance with an embodiment.

FIG. 3 shows an embodiment of the data structure needed to enable the processing. The Dashboard object 302 captures references to all of the test modules 304 each module contains references to one or more triggers 306, overrides 308 and Context Object 310.

Each override 308 maps to a specific method on the code object to be tested. On initial load, the context object represents a list of references to all of the methods in the actual code object associated with the test module. In one or more embodiments, methods contained within the dashboard enable the replacement of the reference for a code object method to a reference to an override, on user request from the Dashboard User Interface. In one embodiment, the overrides enable a dynamic of state by state control of execution of an application module.

Each trigger maps to a specific event or class of events which can be captured in the user interface. For example, a click on a specific user interface object, a keydown event, etc. In one or more embodiments, methods contained within the dashboard object enable the execution of trigger methods on the occurrence of the specified event.

Figure 4:
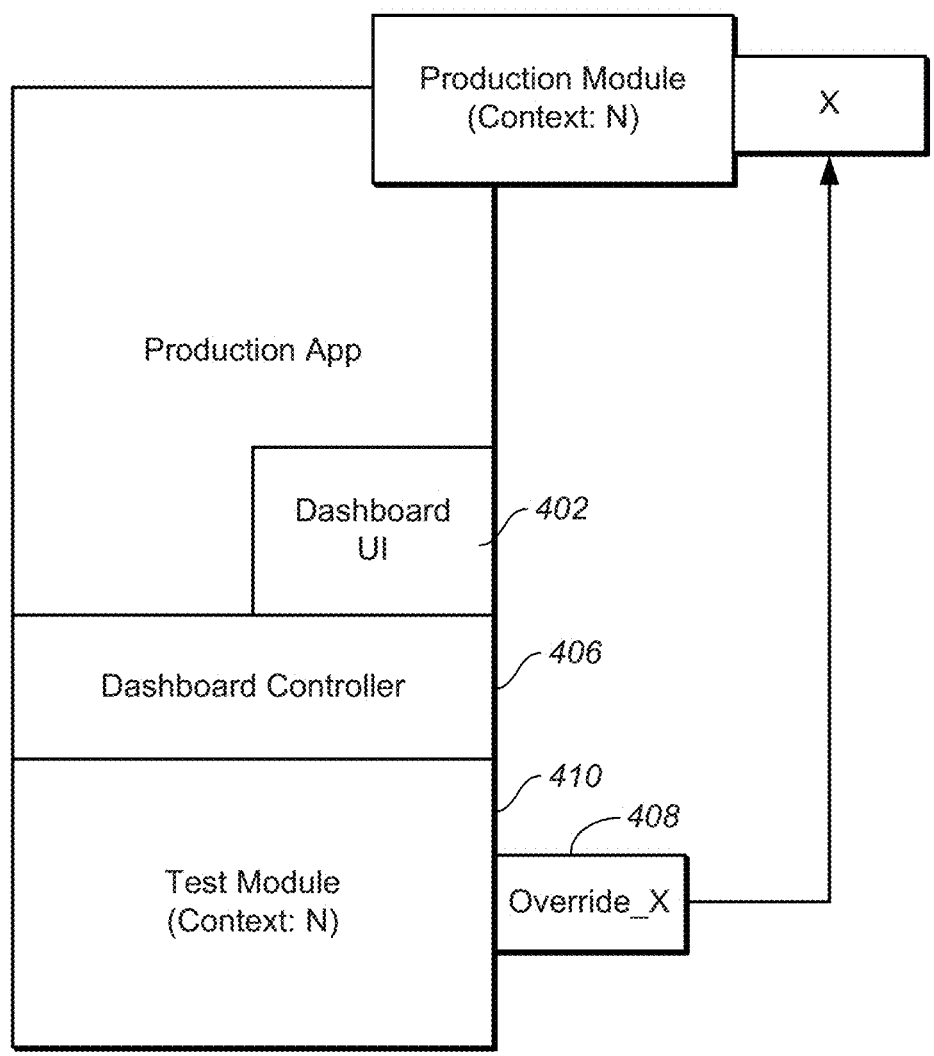
FIG. 4 shows one embodiment of an override method processing, in accordance with an embodiment.

FIG. 4 shows one or more embodiments of the processing around override methods. When the program is initialized, a method list 404 which references the override methods 408 defined for each Test Module are displayed to the user in the Hideable Dashboard UI 402. Each Override Method 408 maps to a method in the Application Module 412. In one or more embodiments, it is not necessary for each method in the Application Module 412 to be mapped to an override method 408.

When the program is initialized, the Context Object 410 is loaded with the methods in the Application Module, and the Context Object 410 is loaded in place of the Application Module, such that if any method is invoked from the Application Module 412, the corresponding method on the Context Object 410 is invoked.

If the user selects a method from the method list, the Hideable Dashboard UI 402 invokes the Dashboard Controller 406 to update the Context Object 410 to replace the method mapped from the Application Module with the method mapped from the Override Methods 408. At that point, if any method is invoked from the Application Module, the corresponding override method is invoked.

Figure 5:
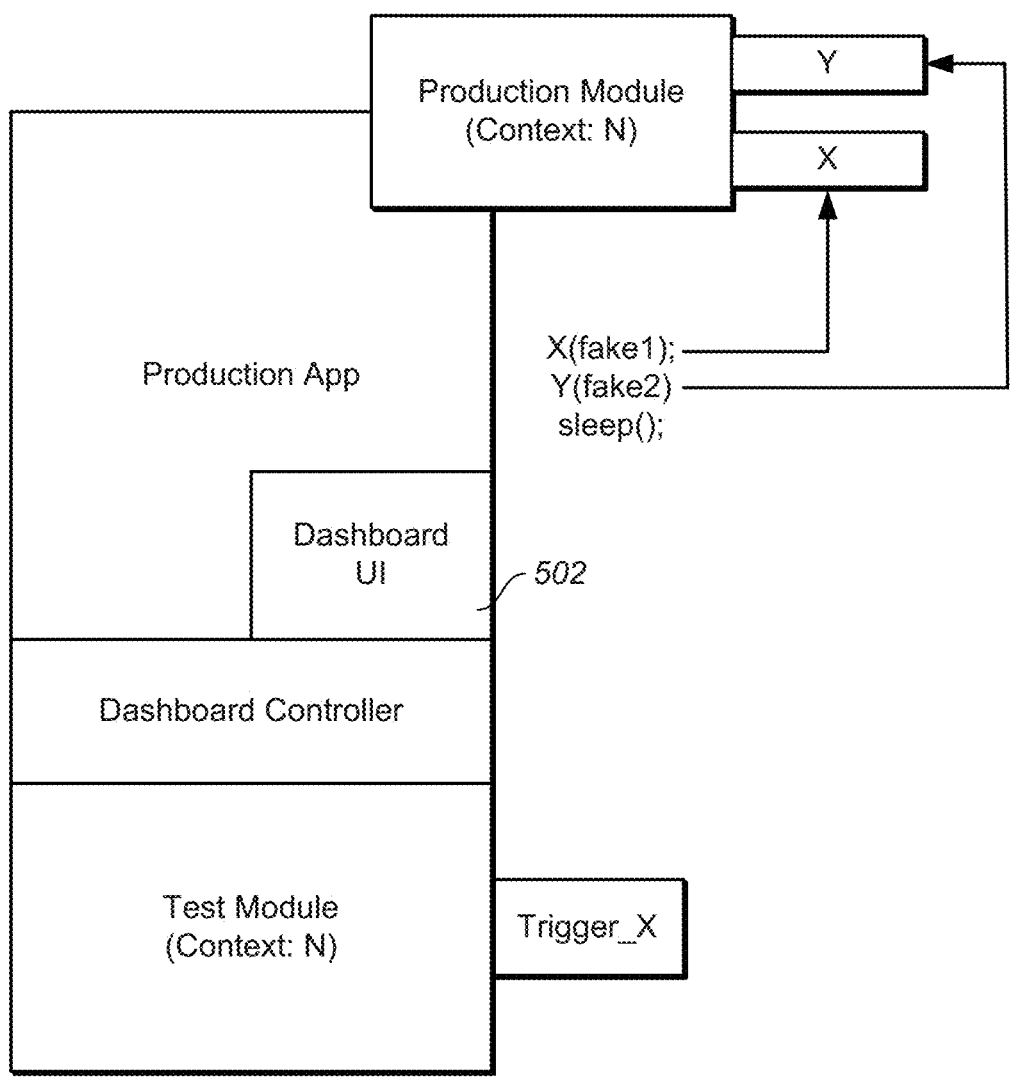
FIG. 5 shows one embodiment of an event method processing, in accordance with an embodiment.

FIG. 5 shows one or more embodiments of the processing around trigger methods. When the program is initialized, the event handling is based on the default UI handling and any events attached to by the running application. When the program is initialized, an event list is displayed to the user in the Hideable Dashboard UI 502. This event list references the event methods associated with a Test Object.

If a user selects a method from the Event List, the Hideable Dashboard UI invokes the Dashboard Controller 406 to attach the event method to an event in the user interface. At that point, when that event is detected by the user interface, the event method is invoked instead of the default or application event method.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The term "modulated data signal" and "carrier-wave signal" includes a signal that has one or more of its characteristics set or changed in such a manner as to encode information, instructions, data, and the like, in the signal.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using dynamic or hot-deployable languages such as JAVA™, PYTHON, JAVASCRiPT/ECMASCRIPT etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of MICROSOFT WINDOWS, APPLE MAC, UNIX/X-Windows, LINUX, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Example Methods of Operation

The following discussion sets forth in detail some example methods of operation of embodiments. With reference to FIGS. 1-5, a flow diagram of a method 600 (see FIG. 6) for debugging an application module is shown, in accordance with an embodiment. Method 600 includes some procedures that, in various embodiments, are carried out by a processor, such as processor 700 of FIG. 7, under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware).

The following discussion of method 600 references FIGS. 1-5 unless specifically noted otherwise.

At 602, method 600 includes accessing a context object coupled with application methods of an application module, such that the application methods are mapped to names of the application methods and execution of the application methods can be replaced by at least one pre-defined method.

At 604, method 600 includes accessing a test module coupled with the computer, the test module containing one or more overrides, where the override is a pre-defined method that can be associated with one of the names of the application methods on a context object.

At 606, method 600 includes accessing a debugging user interface specification, comprising one or user interactions, each interaction associated with a method mapping on the context object.

At 608, method 600 includes accessing a dashboard module, coupled with the computer, comprising references to the test module and the debugging user interface specification.

In one embodiment, method 600 also includes managing one or more methods associated with the application module.

In one embodiment, method 600 further includes displaying one or more test methods to replace methods in the application module.

In one embodiment, method 600 also includes selecting a method of the application module to be replaced, and replacing the selected method of the application module with a test method.

In one embodiment, method 600 also includes restoring the method on the application module with an original application module method.

In one embodiment, method 600 also includes managing a mapping of an event to an event method.

In one embodiment, method 600 includes displaying a mapping of an event to an event method.

In one embodiment, method 600 includes selecting an event to be mapped to an event method.

In one embodiment, method 600 includes attaching an event method to an event.

In one embodiment, method 600 includes restoring a detaching event method from an event.

Example Computer System

Figure 7:
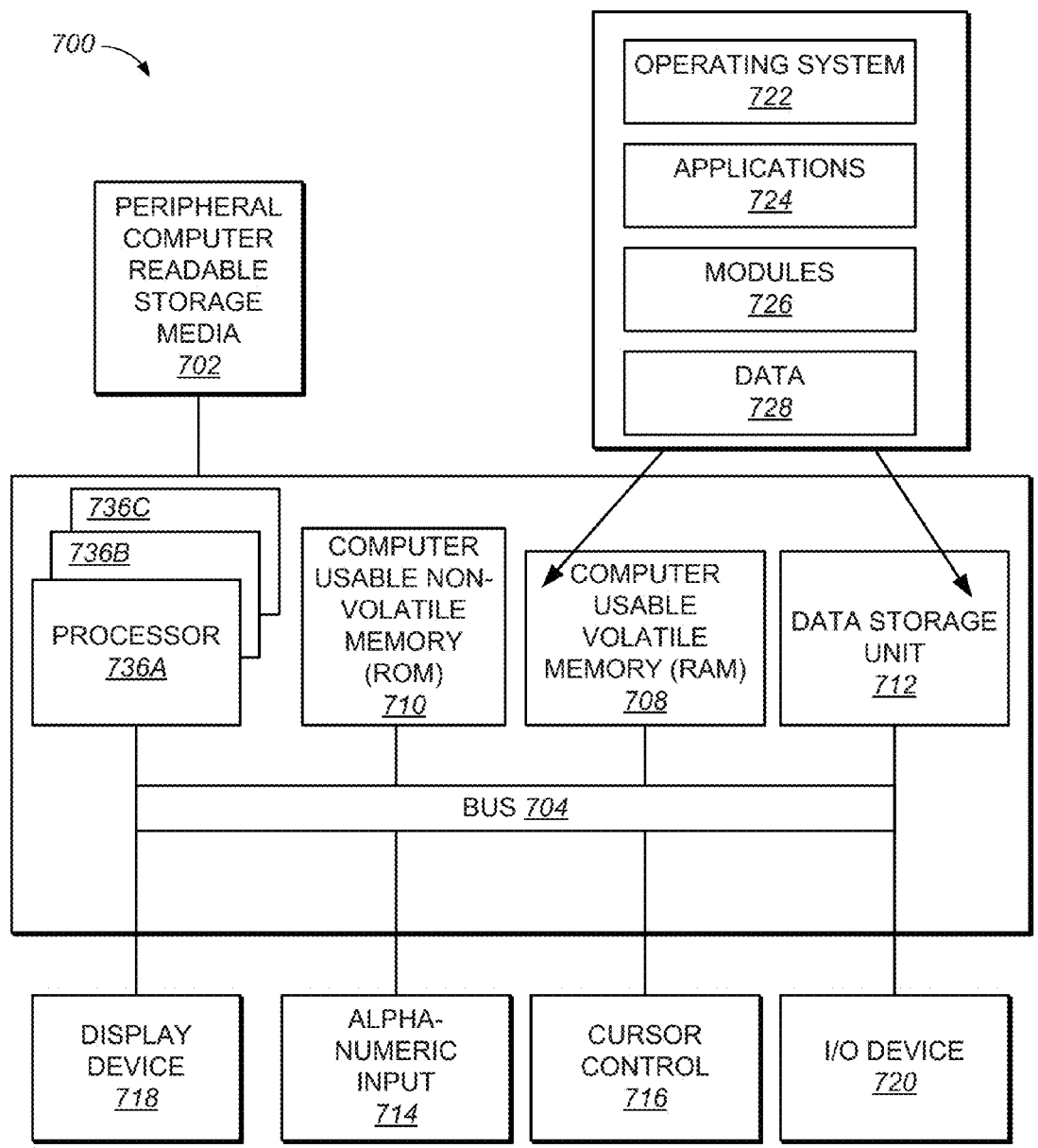
FIG. 7 is a block diagram of an exemplary computer system in accordance with an embodiment.

With reference now to FIG. 7, all or portions of some embodiments described herein are composed of computer-readable and computer-executable instructions that reside, for example, in computer-usable/computer-readable storage media of a computer system. That is, FIG. 7 illustrates one example of a type of computer (computer system 700) that can be used in accordance with or to implement various embodiments which are discussed herein. It is appreciated that computer system 700 of FIG. 7 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 700 of FIG. 7 is well adapted to having peripheral non-transitory computer-readable storage media 702 such as, for example, a floppy disk, a compact disc, digital versatile disc, other disc based storage, universal serial bus "thumb" drive, removable memory card, and the like coupled thereto.

System 700 of FIG. 7 includes an address/data bus 704 for communicating information, and a processor 706A coupled with bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 7066, and 706C may be any of various types of microprocessors. System 700 also includes data storage features such as a computer usable volatile memory 708, e.g., random access memory (RAM), coupled with bus 704 for storing information and instructions for processors 706A, 706B, and 706C.

System 700 also includes computer usable non-volatile memory 710, e.g., read only memory (ROM), coupled with bus 704 for storing static information and instructions for processors 706A, 706B, and 706C. Also present in system 700 is a data storage unit 712 (e.g., a magnetic or optical disk and disk drive) coupled with bus 704 for storing information and instructions. System 700 also includes an optional alphanumeric input device 714 including alphanumeric and function keys coupled with bus 704 for communicating information and command selections to processor 706A or processors 706A, 706B, and 706C. System 700 also includes an optional cursor control device 716 coupled with bus 704 for communicating user input information and command selections to processor 706A or processors 706A, 706B, and 706C. In one embodiment, system 700 also includes an optional display device 718 coupled with bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

FIGS. 8A-8L are example screen shots of debugging an application in accordance with embodiments described herein.

Figure 8A:
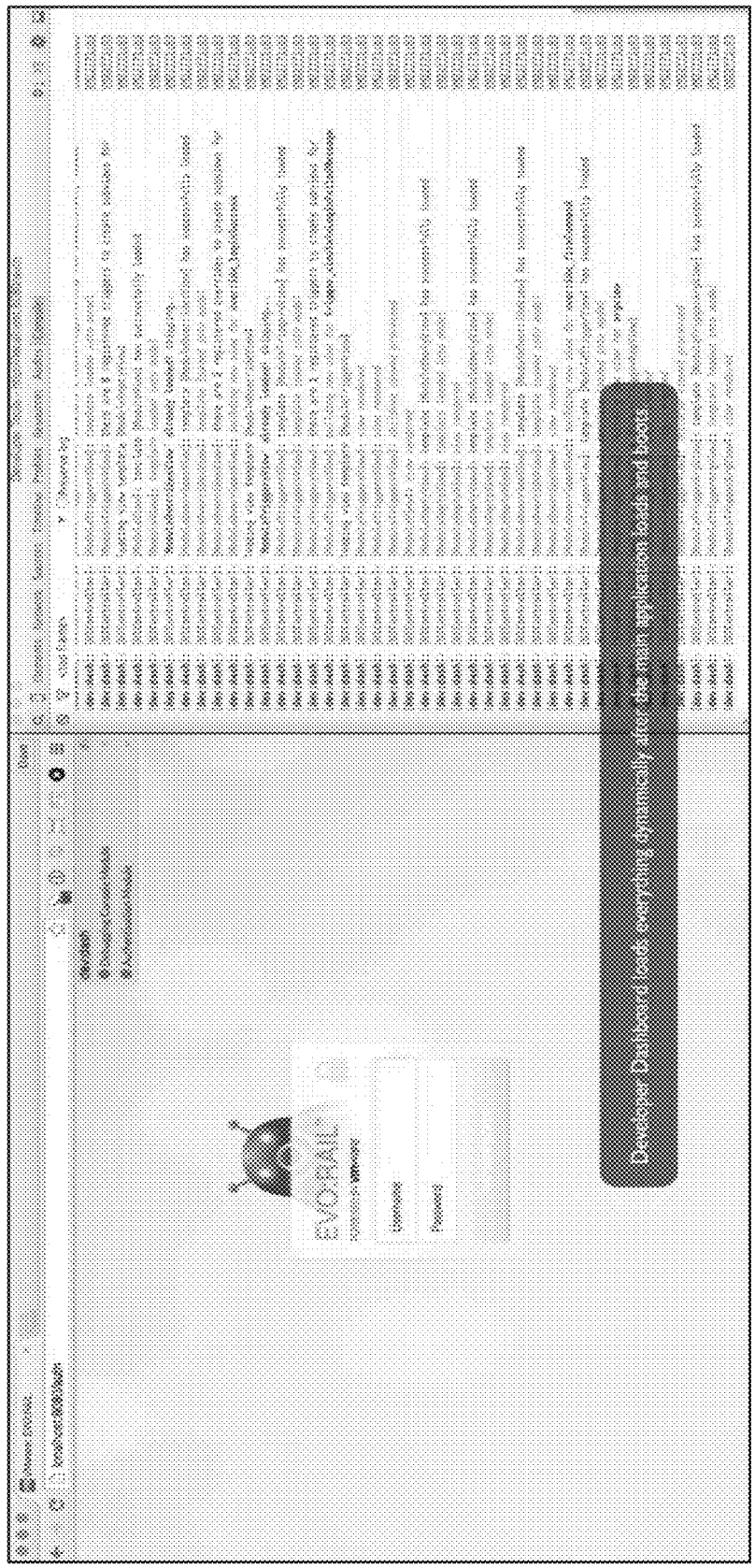
FIGS. 8A-8L are example screen shots of an exemplary user interface in accordance with an embodiment.

FIG. 8A shows a developer dashboard that is loaded dynamically over a main application in accordance with embodiments described herein.

Figure 8B:
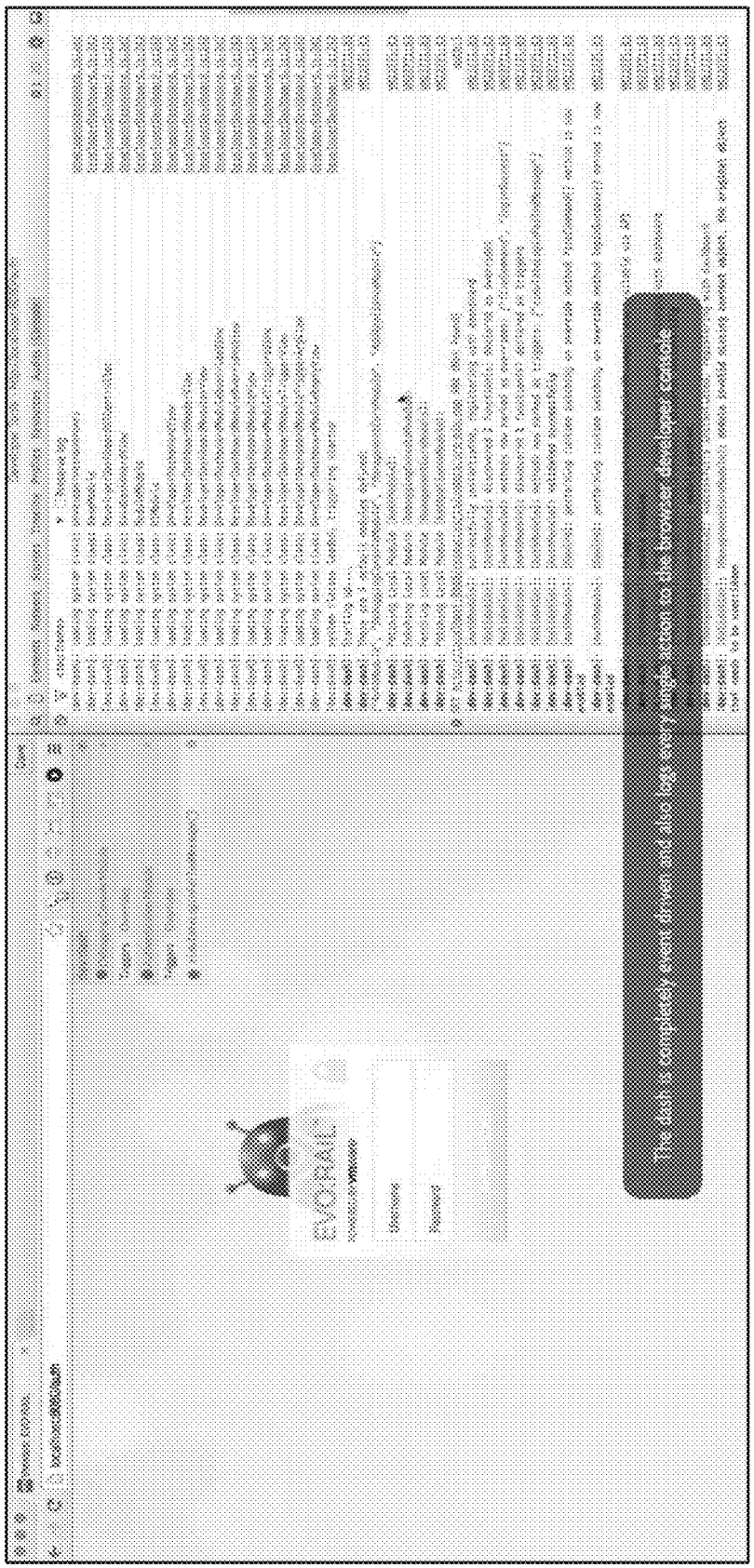

FIG. 8B shows a developer dashboard that provides a log of event driven methods in accordance with embodiments described herein.

Figure 8C:

FIG. 8C shows a developer dashboard that provides developer dash messages about a main application in accordance with embodiments described herein.

Figure 8D:
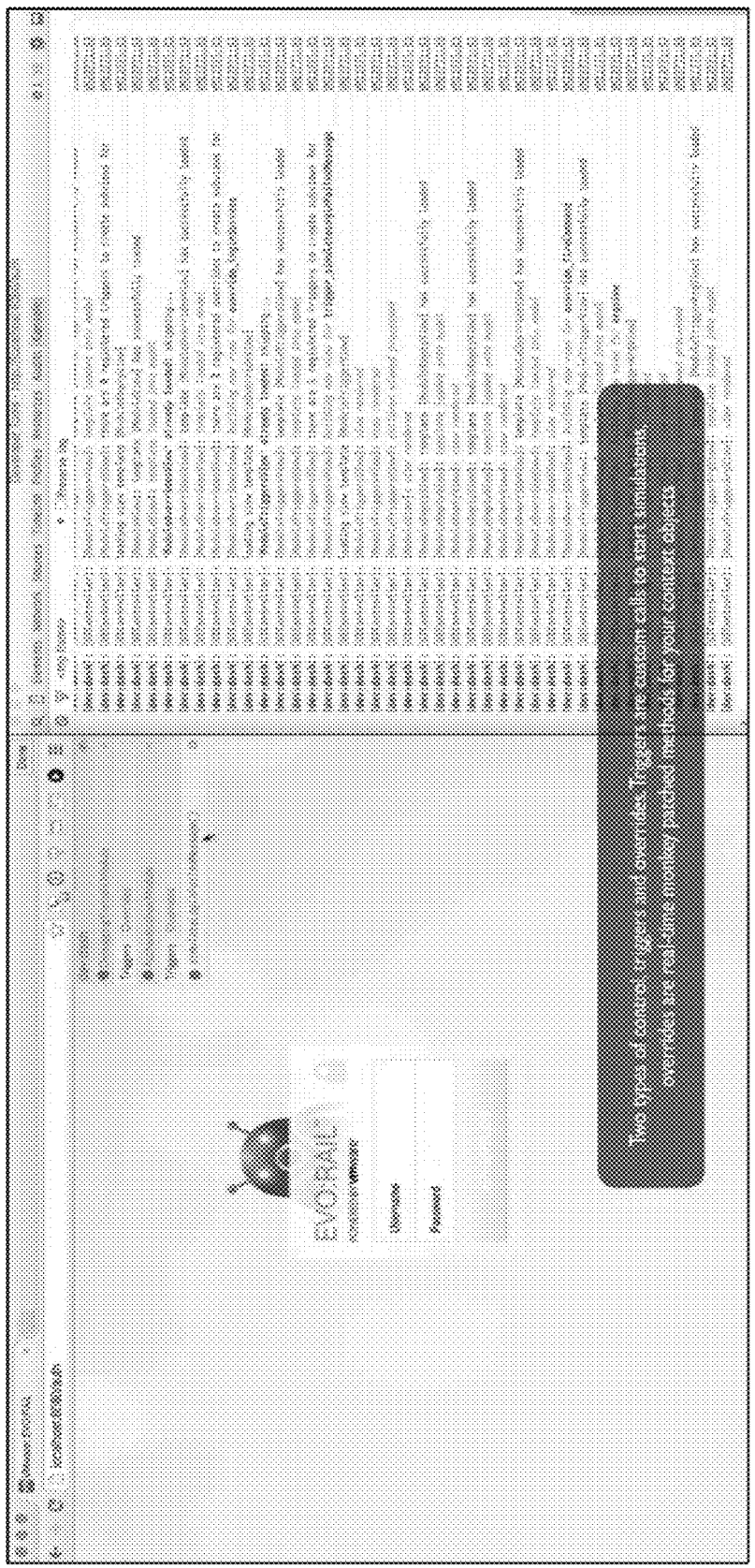

FIG. 8D shows a developer dashboard that provides control triggers and overrides for a main application in accordance with embodiments described herein.

Figure 8E:
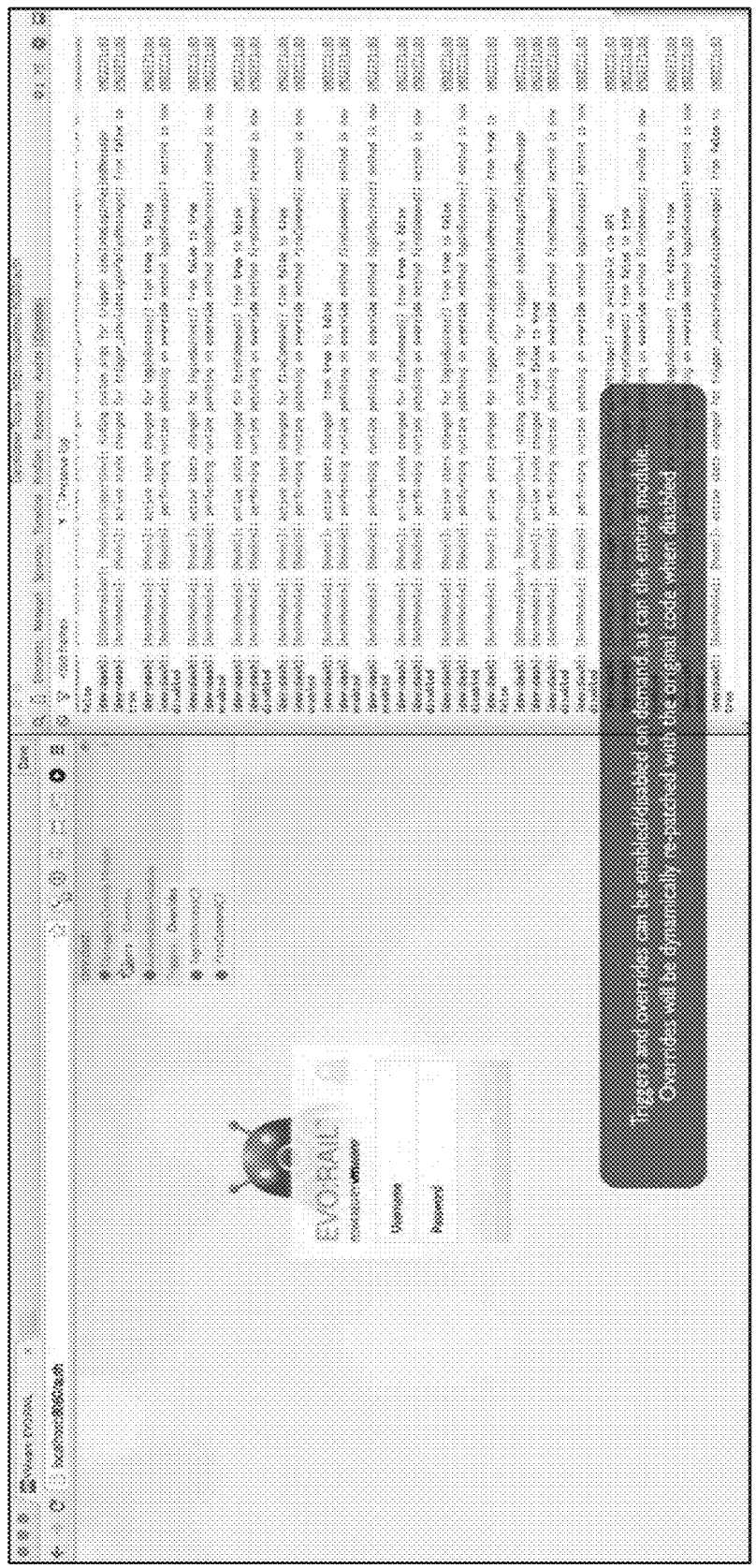

FIG. 8E shows a developer dashboard that enables and disables triggers and overrides for a main application in accordance with embodiments described herein.

Figure 8F:
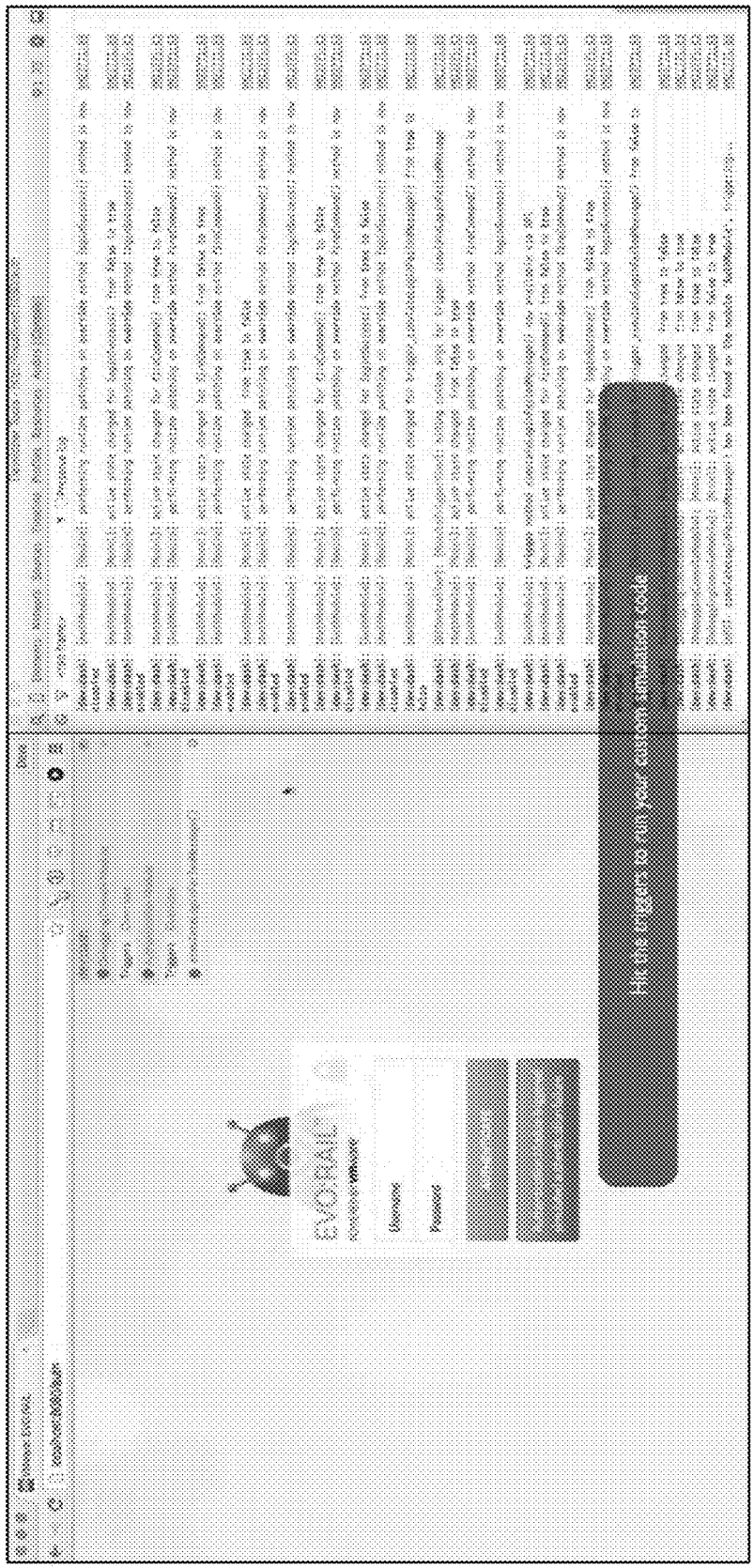

FIG. 8F shows a developer dashboard that enables the insertion of simulation code into a main application code without requiring the main application code to be testing aware in accordance with embodiments described herein.

Figure 8G:
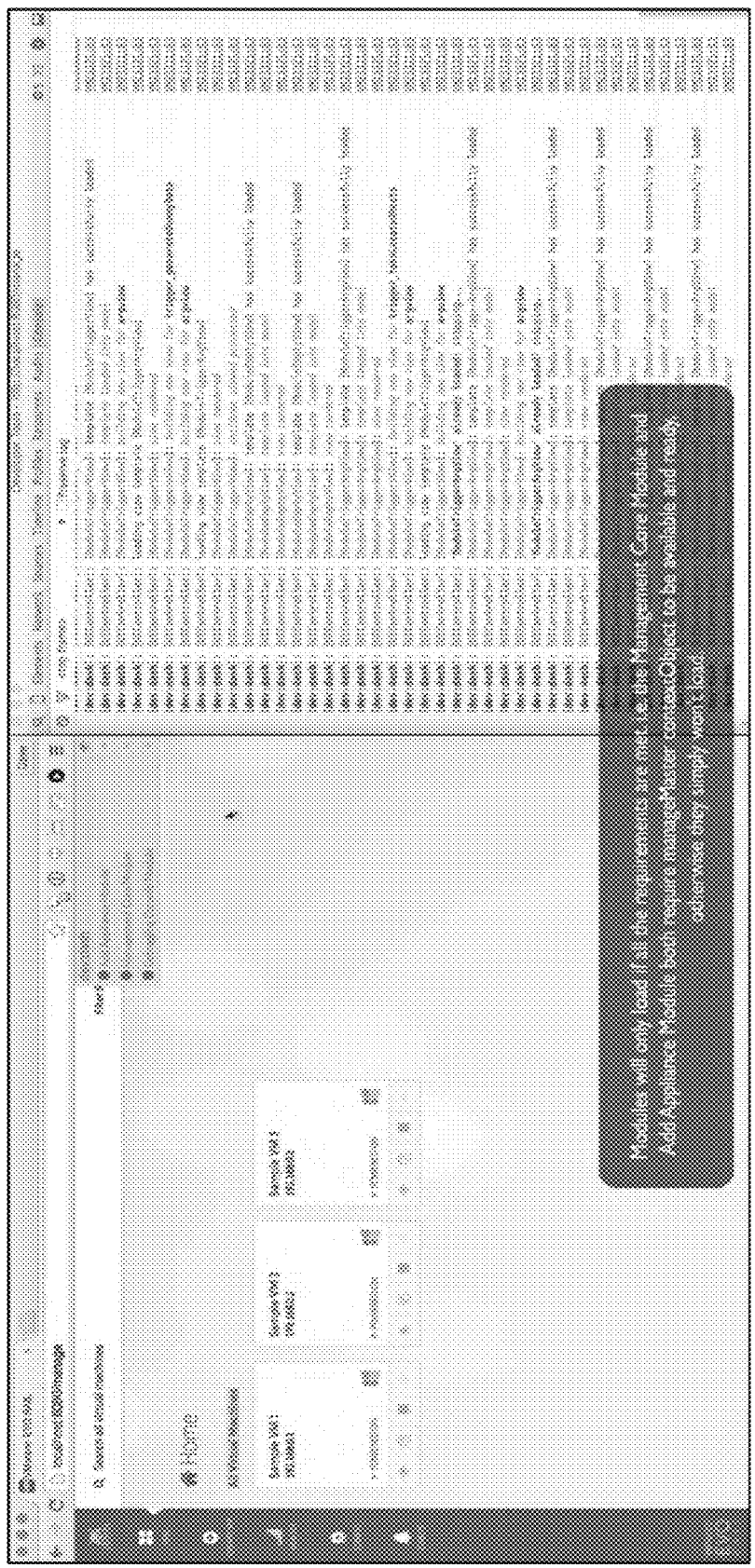

FIG. 8G shows a developer dashboard that debugs a main application that is not test aware in accordance with embodiments described herein.

Figure 8H:
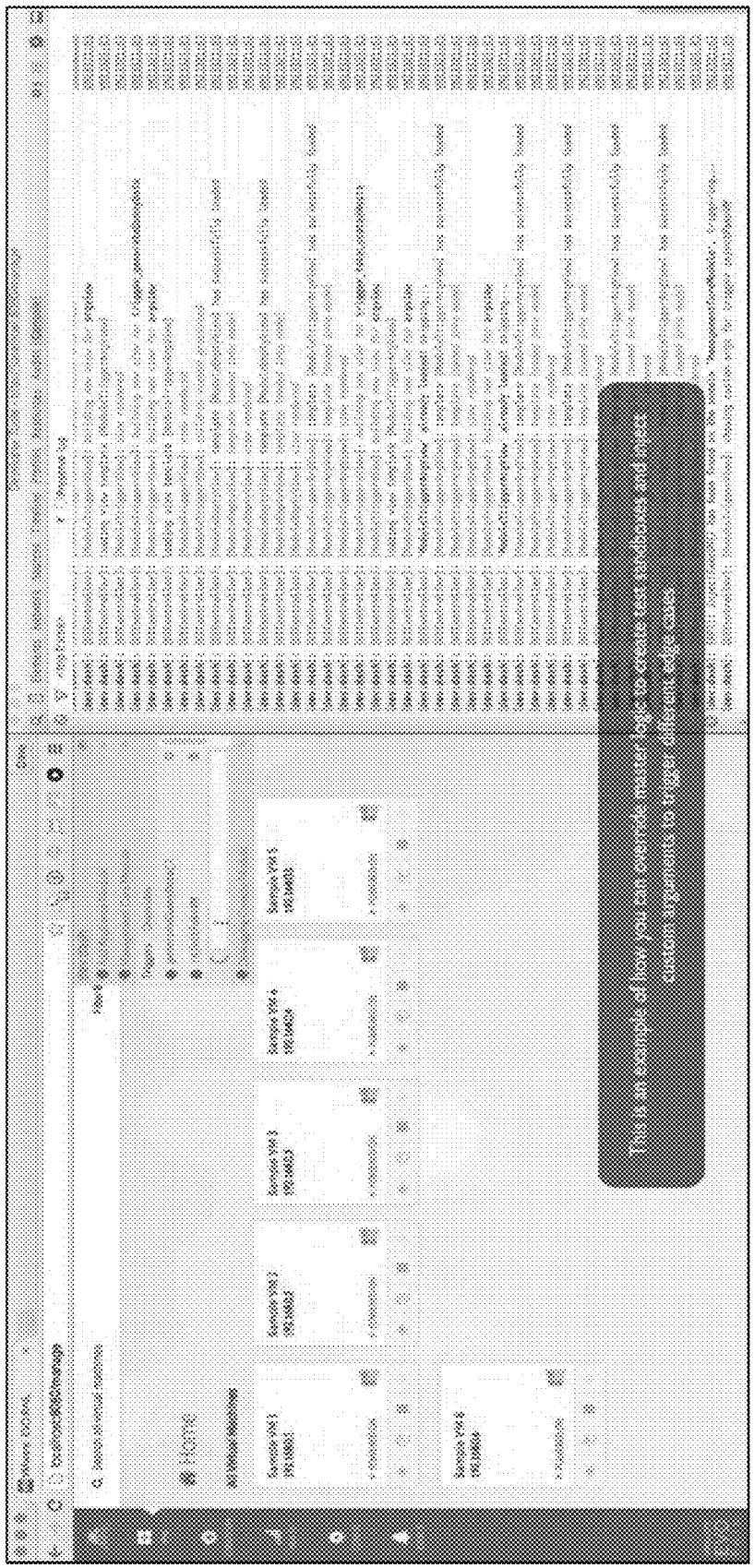

FIG. 8H shows a developer dashboard that provides an override of a main application method in accordance with embodiments described herein.

Figure 8I:
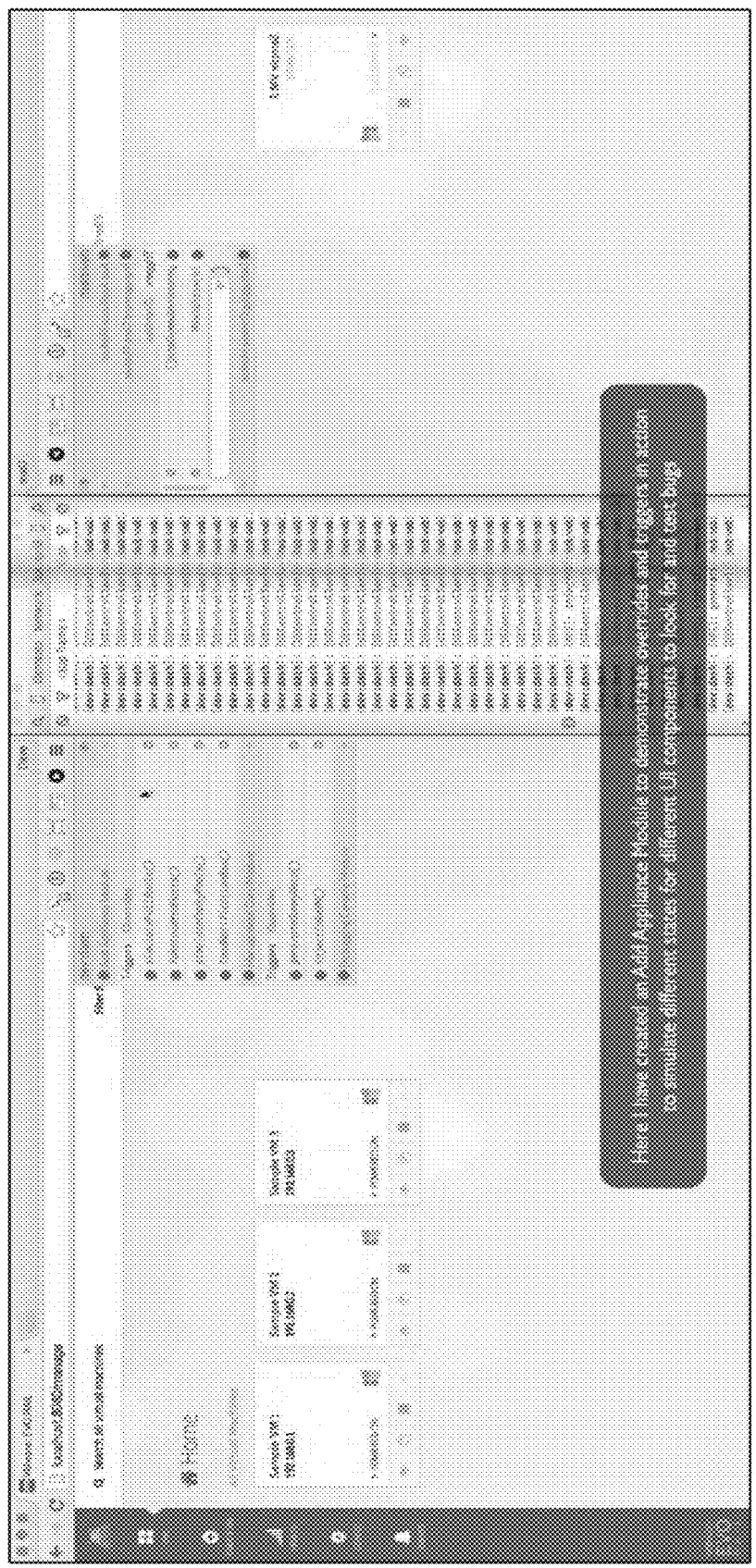

FIG. 8I shows a developer dashboard that provides state by state dynamic testing of a main application in accordance with embodiments described herein.

Figure 8J:
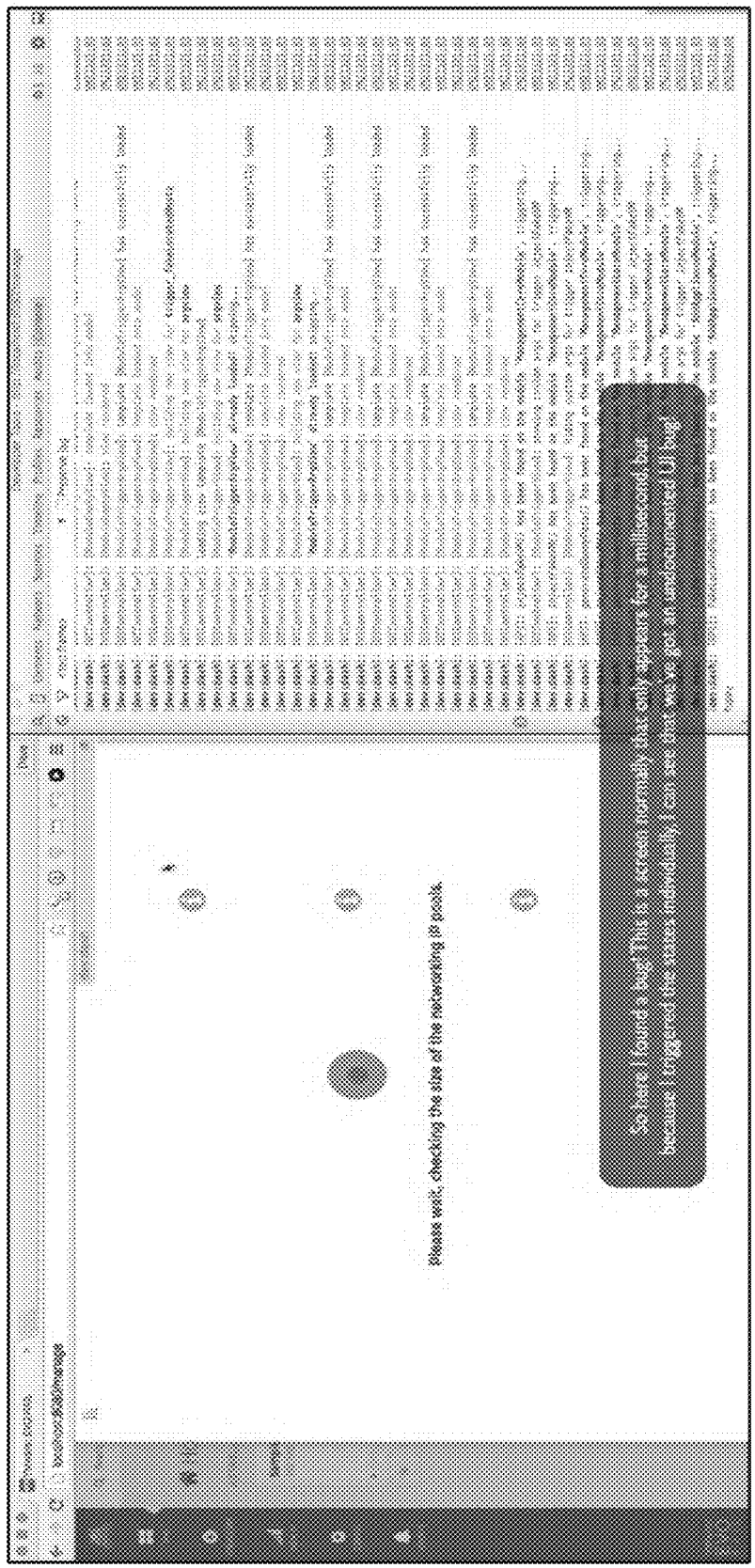

FIG. 8J shows a developer dashboard that identifies bugs of a main application that may not be noticeable under typical testing conditions in accordance with embodiments described herein.

Figure 8K:
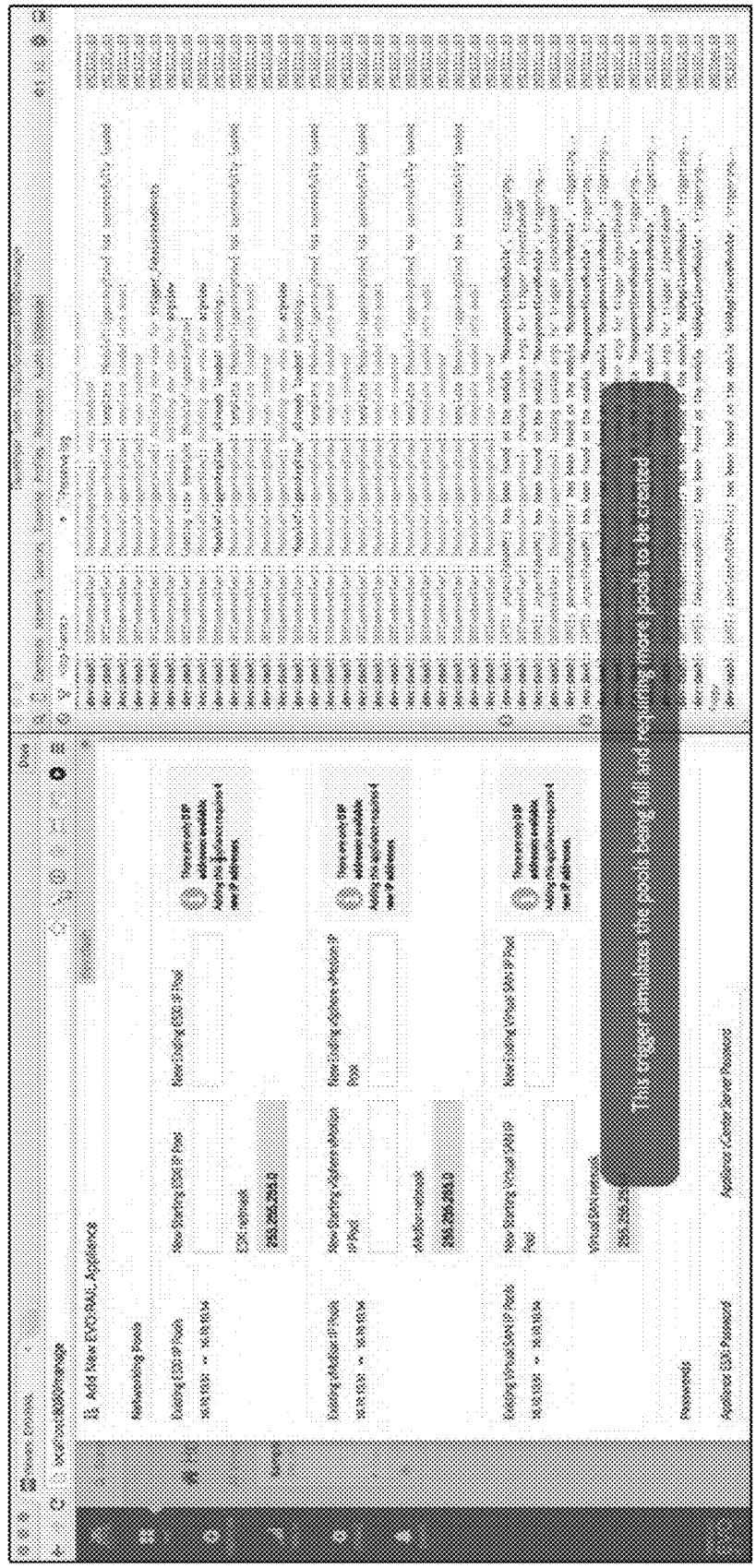

FIG. 8K shows a developer dashboard that provides simulated resource availability for a main application in accordance with embodiments described herein.

Figure 8L:
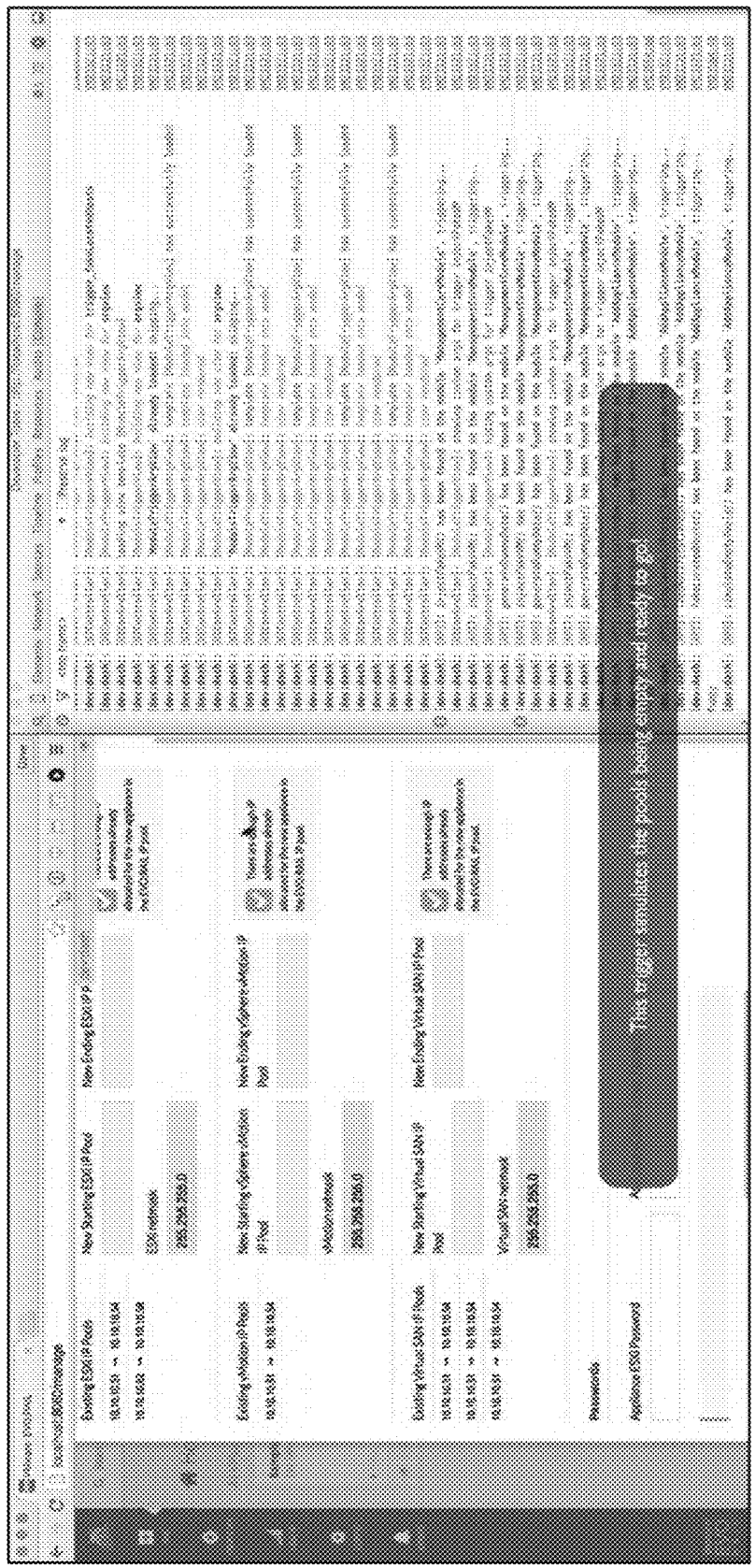

FIG. 8L shows a developer dashboard that provides simulated workload for a main application in accordance with embodiments described herein.

In one embodiment, the debugging system described herein is provided as an article of manufacture, which comprises a computer readable medium having stored therein a computer program for a method for debugging of a production application, the computer program comprising a first code segment which, when executed on a computer, accesses a context object associated with an application method of the production application, such that the application method is mapped to an application name and execution of the application method can be replaced by a first pre-defined replacement method, a second code segment which, when executed on the computer, accesses a test module containing one or more overrides and a reference to the application method, where the override is associated with the first pre-defined replacement method and is associated with the application name associated with the context object, a third code segment which, when executed on the computer, accesses a debugging user interface for implementing one or user interactions, each interaction associated with a method mapping on the context object, a fourth code segment which, when executed on the computer, accesses a dashboard module, coupled to the computer, comprising references to test modules and a debugging user interface specification, wherein a main user interface specification includes a reference to the dashboard module and wherein on request in the debugging user interface specification, the one or more overrides are substituted for the application method.

In one embodiment, the test module is further associated with a trigger, the trigger configured to act upon of a specified event of the application method.

In one embodiment, the debugging user interface specification is further configured to enable and disable individual triggers of the application method.

In one embodiment, the debugging user interface specification overrides are substituted for the application method without requiring specific debugging code to be disposed in the production application.

In one embodiment, the debugging user interface specification overrides are substituted for the application method dynamically.

In one embodiment, the debugging user interface specification overrides are selectively substituted for the application method.

In one embodiment, the debugging platform described herein is implemented on a computer system comprising an application method manager configured for managing methods associated with at least one application module, a display controller for displaying test methods to replace production methods in the application module, a user interface configured to enable selection of a method to be replaced, and an application method replacement manager for replacing at least one method on the application module with a test method.

In one embodiment, the computer system for implementing the debugging platform described herein includes an application restoration module for restoring a method on the application module with an original application module method.

In one embodiment, the computer system for implementing the debugging platform described herein replaces the method dynamically and without requiring specific test code in the application module.

In one embodiment, the computer system for implementing the debugging platform described herein replaces the method selectively and without requiring specific test code in the application module.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

I claim:

1. An article of manufacture, which comprises a non-transitory computer readable medium having stored therein a computer program for a method for debugging of a production application, said computer program comprising:
a first code segment which, when executed on a computer, accesses a context object associated with an application method of said production application, to map the application method to an application name and replace execution of said application method by a first pre-defined replacement method;
a second code segment which, when executed on said computer, accesses a test module containing one or more overrides and a reference to said application method, where the one or more overrides are associated with said first pre-defined replacement method and are associated with the application name associated with said context object;
a third code segment which, when executed on said computer, accesses a debugging user interface to implement one or more user interactions, each interaction of said one or more user interactions associated with a method mapping on said context object;
a fourth code segment which, when executed on said computer, accesses a dashboard module, coupled to the computer, comprising dashboard references to the test module and a debugging user interface specification for the debugging user interface, the dashboard references loading the dashboard module into the production application to load the test module which loads the context object associated with the test module;
wherein a main user interface specification of the debugging user interface specification includes a reference to the dashboard module; and
wherein on request in the debugging user interface specification, the one or more overrides are dynamically substituted for said application method.

2. The article of manufacture of claim 1 wherein the test module is further associated with a trigger, said trigger configured to act upon of a specified event of said application method.

3. The article of manufacture of claim 1 wherein the debugging user interface specification is further configured to enable and disable individual triggers of said application method.

4. The article of manufacture of claim 1 wherein the one or more overrides are substituted for the application method without requiring specific debugging code to be disposed in said production application.

5. The article of manufacture of claim 1 wherein said one or more overrides are selectively substituted for the application method.

6. A method for debugging of an application module of a production application, the application module executing on a computer, said method comprising:
accessing a context object coupled with application methods of an application module, to map the application methods to names of the application methods and replace execution of the application methods by at least one pre-defined method;
accessing a test module coupled with the computer, said test module containing one or more overrides and a reference to said application methods, where each of the one or more overrides is a pre-defined method that is associated with one of the names of the application methods on the context object;
accessing a debugging user interface specification, comprising one or more user interactions, each interaction associated with a method mapping on the context object;
accessing a dashboard module, coupled with the computer, comprising dashboard references to the test module and the debugging user interface specification, the dashboard references loading the dashboard module into the production application to load the test module which loads the context object associated with the test module; and
dynamically substituting the one or more overrides for the application methods, on request in the debugging user interface specification.

7. The method of claim 6 further comprising:
managing one or more methods associated with the application module.

8. The method of claim 7 further comprising:
displaying one or more test methods to replace methods in the application module.

9. The method of claim 8 further comprising:
selecting a method of said application module to be replaced, and
replacing the selected method of the application module with a test method.

10. The method in claim 9 further comprising:
restoring said method on the application module with an original application module method.

11. The method in claim 10 further comprising:
managing a mapping of an event to an event method.

12. The method in claim 11 further comprising: displaying the mapping of the event to the event method.

13. The method in claim 12 further comprising: selecting the event to be mapped to the event method.

14. The method in claim 13 further comprising: attaching the event method to the event.

15. The method in claim 14, the method further comprising: restoring a detaching event method from the event.

16. A computer system comprising:
a hardware memory storing a computer program, the computer program, when executed by a processor, performing a method for debugging of a production application, said method comprising:
accessing a context object coupled with application methods of an application module, to map the application methods to names of the application methods and replace execution of the application methods by at least one pre-defined method;
accessing a test module coupled with the computer, said test module containing one or more overrides and a reference to said application methods, where each of the one or more overrides is a pre-defined method that is associated with one of the names of the application methods on the context object;
accessing a debugging user interface specification, comprising one or more user interactions, each interaction associated with a method mapping on the context object;
accessing a dashboard module, coupled with the computer, comprising dashboard references to the test module and the debugging user interface specification, the dashboard references loading the dashboard module into the production application to load the test module which loads the context object associated with the test module; and dynamically substituting the one or more overrides for the application methods, on request in the debugging user interface specification.

17. The computer system of claim 16 further comprising: restoring a method on the application module with an original application module method.

18. The computer system of claim 16 wherein said application methods are replaced without requiring specific test code in said application module.

19. The computer system of claim 16 wherein said application methods are replaced selectively and without requiring specific test code in said application module.

* * * * *